Patented Mar. 15, 1938

2,111,272

UNITED STATES PATENT OFFICE 2,111,272

ABRASIVE MATERIAL

Paul M. Paulson, Lewiston, N. Y., assignor to E. I. du Pont de Nemours & Company, Wilmington, Del., a corporation of Delaware No Drawing. Application August 18, 1936, Serial No. 96,652

7 Claims. (Cl. 51—280)

This invention relates to abrasive materials and, more particularly, to the manufacture of flexible abrasive sheets such as sand paper, emery cloth, and the like.

The flexible abrasives now in general commercial use usually consist of a suitable backing material, such as paper or cloth, to which abrasive granules are secured by means of glue or a similar adhesive. The principal disadvantage of glue as a bonding agent for the abrasive granules is the fact that it is comparatively brittle and, when the paper or cloth is flexed, the film of glue tends to crack and flake off, thereby shortening the useful life of the abrasive sheet. A further disadvantage of glue as a bonding agent for flexible abrasives is the fact that it is very sensitive to water and thus is unsatisfactory where the abrasive sheet is to be used under conditions of high humidity or in the presence of water.

It is an object of the present invention to provide flexible abrasive materials having an improved type of bond for securing the abrasive granules to the backing sheets; a further object is to provide abrasive sheets characterized by high flexibility of the bonding agent; a further object is to provide means for adjusting the flexibility and the water-resisting qualities of the bonding material as desired for any particular purpose. Other objects and advantages of the invention will be apparent from the ensuing description of the invention.

The foregoing objects are accomplished in accordance with the invention by utilizing, as a bonding agent for securing abrasive granules to a flexible base material, polyvinyl alcohol, either alone or in combination with insolubilizing agents, and/or plasticizers as will be described more particularly hereinafter.

Polyvinyl alcohol is a water soluble resin-like material which is usually obtained by the hydrolysis of polymerized vinyl esters such as polyvinyl acetate. Polyvinyl alcohol can be made in a number of modifications of different degrees of polymerization, the degree of polymerization depending largely upon the extent to which the polyvinyl compound from which it is derived has been polymerized. All of these modifications of polyvinyl alcohol are to some extent soluble in water. The more highly polymerized form is less soluble and produces solutions of higher viscosity for equivalent concentrations than the lower polymers. There are also a number of the so-called partial derivatives of polyvinyl alcohol in which some of the hydroxyl groups in the molecule are replaced by other radicals such as ester radicals or acetal radicals. Such partial derivatives may be produced by the incomplete saponification of vinyl esters or by the incomplete reaction of polyvinyl alcohol with acids, aldehydes or other compounds which react with hydroxyl groups. As would be expected the properties of the partial derivatives of polyvinyl alcohol vary in accordance with the proportion of hydroxyl radicals that have been substituted by other groups. When the hydroxyl radicals sufficiently predominate, the partial derivatives show essentially the properties of polyvinyl alcohol and, like polyvinyl alcohol itself, are soluble in water as distinguished from the esters, acetals, etc. which are soluble only in organic solvents.

Consequently, the term "polyvinyl alcohol" is used herein and in the appended claims to designate generically pure polyvinyl alcohol and also such partial derivatives thereof as contain a sufficient number of unsubstituted hydroxyl groups as to render the compound soluble in water.

In preparing the flexible abrasive sheets of the invention a suitable base material such as paper or cloth, is coated with a solution of polyvinyl alcohol. The solvent is allowed to evaporate sufficiently to produce a tacky surface upon which is then distributed grains of the desired size of any desired abrasive material such as sand, silicon carbide, crystalline alumina or the like. The sheet may then be dried at ordinary or elevated temperatures to remove the remaining solvent and to produce an adherent flexible bond between the abrasive particles and the backing sheet. It is usually desirable first to provide the backing sheet with a preliminary size which may consist of any sizing material which will permit good adhesion of the polyvinyl alcohol; we prefer, however, to utilize polyvinyl alcohol solution for the preliminary sizing coat or coats as well as for the main coating for bonding the abrasive grains. It is also advantageous, in order to produce maximum adherence of the abrasive granules, to apply a final coating of polyvinyl alcohol over the surface of the abrasive layer.

The concentration of polyvinyl alcohol in the solutions used for the coating processes may vary within considerable limits, depending largely upon the degree of polymerization of the particular form of polyvinyl alcohol used. In general, solutions ranging in concentration from 2 to 10% by weight of polyvinyl alcohol may be used. For most purposes we have found that a 5% aqueous solution of a relatively highly polymerized form of polyvinyl alcohol gives excellent results. In many cases it is advantageous to heat the polyvinyl alcohol solution above room temperature in order to decrease its viscosity and to facilitate its application. Thus, we prefer to apply the polyvinyl alcohol solutions at a temperature of about 50 to 80° C. although satisfactory coatings may be obtained at higher or lower temperatures. The solution may be applied in any desired manner as by dipping, spraying, or brushing.

We have also found that the water sensitivity of the polyvinyl alcohol bond can be decidedly improved by treatment with agents which tend to insolubilize polyvinyl alcohol. Examples of materials which are suitable for this purpose are various inorganic compounds such as borates, perborates, silicates, chromic acid, chromates, dichromates, alum, and ferric chloride; and organic hardening agents such as tannins, formaldehyde and other aldehydes, azo dyes and the like. The insolubilizing agents may be applied to the backing material prior to the application of the polyvinyl alcohol adhesive or the coated paper may be given a final treatment with the insolubilizing agent, or both. In some cases it is also possible to include an insolubilizing agent in the polyvinyl alcohol solution used, although this is usually not so desirable for the reason that these materials increase the viscosity of the polyvinyl alcohol solutions and render the application thereof somewhat more difficult. It is particularly advantageous to treat the surface of the backing material with an insolubilizing agent before the application of the first coat of polyvinyl alcohol solution in order to avoid excessive penetration of the polyvinyl alcohol into the backing material. Such treatment results in appreciable savings in the amount of polyvinyl alcohol required to produce the bond.

The increased resistance to water and moisture which results from the use of insolubilizing agents is accompanied to some extent by a corresponding decrease in the flexibility of the bond. However, we have found that flexibility can be materially increased by incorporating with the polyvinyl alcohol solution a suitable plasticizer or softening agent for polyvinyl alcohol. Among the plasticizers which are suitable for this purpose may be mentioned polyhydroxy compounds such as glycerol, polyglycerols, glycols, polygylcols, starches, sugars, dimethyl pentaerythrite, diglycol stearate, gum tragacanth, formamide, and metal sulfocyanides.

The invention may be further illustrated by the following specific examples:—

Example 1

A sheet of heavy kraft paper was sized by brushing on one surface thereof a 5% aqueous solution of high viscosity polyvinyl alcohol and drying it at a temperature of 65° C. A second sizing coat was applied and dried in the same manner. The sized paper was then brushed for a third time with the 5% solution of polyvinyl alcohol and, while the surface was still wet, No. 50 grain silicon carbide powder was dusted thereon until the entire surface was uniformly covered. The paper was then pressed under a heavy iron roll and finally dried in an oven at 65° C. A very light coating of 5% polyvinyl alcohol solution was then brushed over the abrasive coating and the paper allowed to dry at room temperature.

The resultant coating was much more flexible and more resistant to water than commercial papers utilizing glue as the bonding agent. The adherence of the granules to the paper was excellent.

Example 2

The same procedure as described in Example 1 was followed with the exception that a 10% aqueous solution of polyvinyl alcohol was used for binding No. 80 grain silicon carbide granules to the paper base. As in Example 1, a 5% polyvinyl alcohol solution was used for the preliminary sizing coats and for the final coat over the surface of the abrasive.

The resultant abrasive paper was characterized by substantially the same excellent properties as the product of Example 1.

Example 3

The procedure of Example 1 was followed with the exception that 0.5% of glycerol was added to the 5% polyvinyl alcohol solution. The resultant abrasive sheet was considerably more flexible than that produced by the process of Example 1, and was characterized by excellent adherence of the grain to the backing sheet.

Example 4

Heavy khaki cloth was coated according to the procedure of Example 3. The abrasive coating in this instance was likewise very flexible and characterized by excellent adherence to the cloth.

Example 5

The procedure in Example 3 was repeated, substituting 0.5% of pentaglycol for the glycerine in the 5% polyvinyl alcohol solution of that example. The characteristics of the resultant product were essentially the same as those of the product obtained by the procedure of Example 3.

Example 6

The procedure of Example 1 was followed with the exception that the paper base was treated with an aqueous borax solution of 0.5% concentration by weight prior to the application of the first polyvinyl alcohol sizing coat. The borax treatment materially reduced the amount of polyvinyl alcohol absorbed by the paper and also somewhat improved the water-resistivity of the product.

Example 7

An abrasive paper prepared as in Example 1 was immersed in an 0.5% borax solution and dried. This treatment caused a very substantial increase in the water resistivity of the abrasive coating with a slight decrease in its flexibility.

It is to be understood that the invention is not limited to the specific embodiments thereof described hereinabove, but includes all such modifications, variations, and equivalents as fall within the scope of the appended claims.

I claim:

1. A flexible abrasive article comprising a flexible base, abrasive grains, and a bond for securing said abrasive grains to said base, said bond comprising polyvinyl alcohol and an insolubilizing agent therefor.

2. A flexible abrasive article comprising a flexible base, abrasive grains, and a bond for securing said abrasive grains to said base, said bond comprising polyvinyl alcohol, and a plasticizer and an insolubilizing agent therefor.

3. A flexible abrasive article comprising a flexible base, abrasive grains, and a bond for securing said abrasive grains to said base, said bond comprising polyvinyl alcohol and borax.

4. A method of preparing a flexible abrasive sheet which comprises applying an insolubilizing agent for polyvinyl alcohol to a flexible base material, coating the resultant surface with a solution of polyvinyl alcohol, distributing abrasive grains over the coated surface and drying said sheet to form an adhesive bond between the abrasive grains and the base material.

5. A method of preparing a flexible abrasive sheet which comprises applying a borax solution to a surface of a flexible base material, coating said surface with a solution of polyvinyl alcohol, distributing abrasive grains over the coated surface and drying said sheet to form an adhesive bond between the abrasive grains and the base material.

6. A method for preparing a flexible abrasive sheet which comprises applying to a flexible base material a solution of polyvinyl alcohol, distributing abrasive grains over the coated surface and treating the resultant abrasive coated surface with an insolubilizing agent for polyvinyl alcohol.

7. A method of preparing a flexible abrasive sheet which comprises applying to a flexible base material a solution of polyvinyl alcohol, distributing abrasive grains over the coated surface, applying to the resultant abrasive coated surface another coat of polyvinyl alcohol solution, and finally treating the coated sheet with an insolubilizing agent for polyvinyl alcohol.

PAUL M. PAULSON.